Jan. 2, 1945. R. OLLIVIER 2,366,549
FASTENING DEVICE FOR WEARING APPAREL, DRAPERIES, AND THE LIKE
Filed May 16, 1941 2 Sheets-Sheet 1
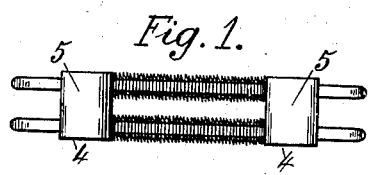
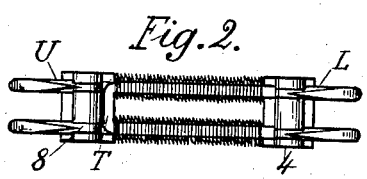
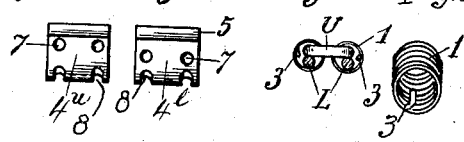
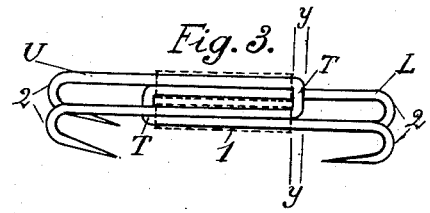
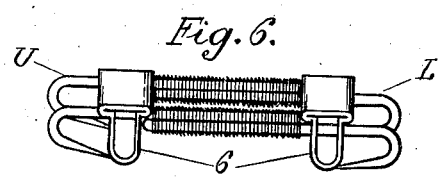
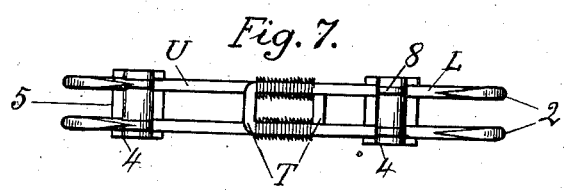
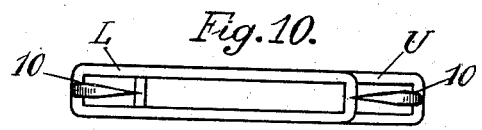
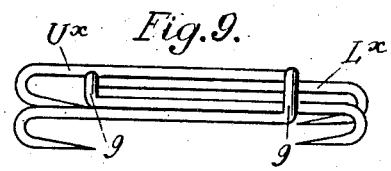
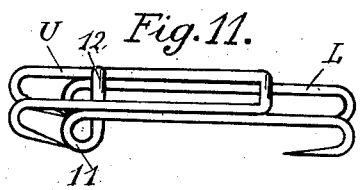
INVENTOR.
Robert Ollivier Jan. 2, 1945. R. OLLIVIER 2,366,549
FASTENING DEVICE FOR WEARING APPAREL, DRAPERIES, AND THE LIKE
Filed May 16, 1941 2 Sheets-Sheet 2
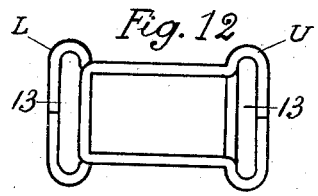
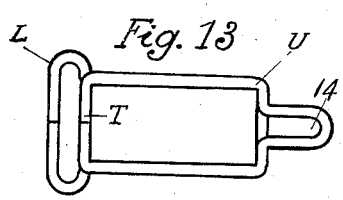
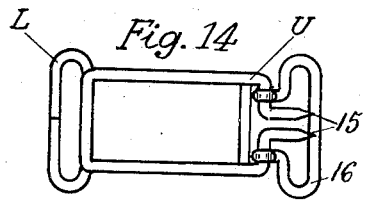
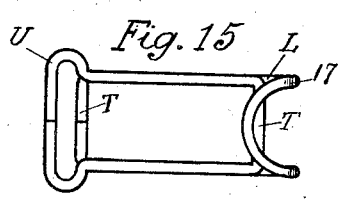
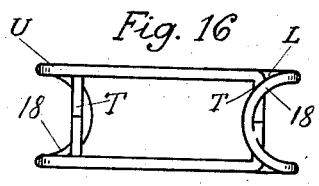
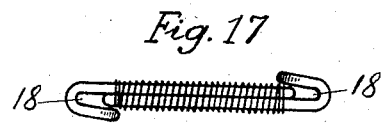
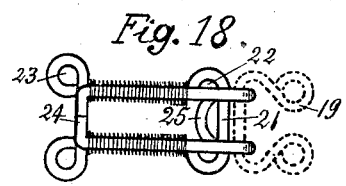
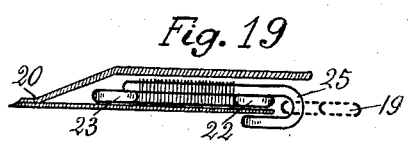
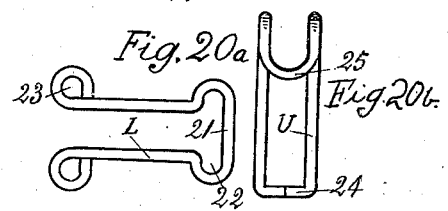
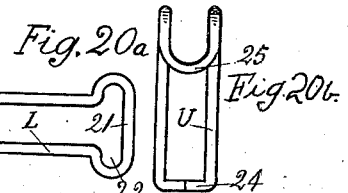
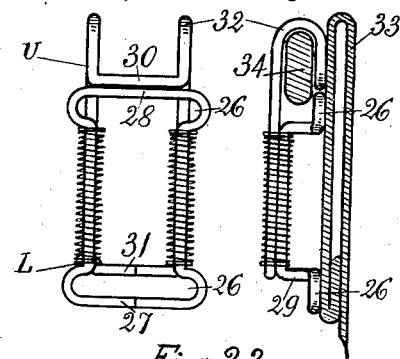
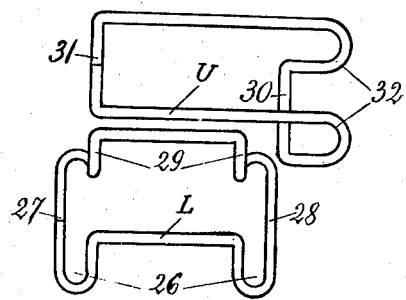
INVENTOR.
Robert Ollivier Patented Jan. 2, 1945

2,366,549

UNITED STATES PATENT OFFICE 2,366,549

FASTENING DEVICE FOR WEARING APPAREL, DRAPERIES, AND THE LIKE

Robert Ollivier, New York, N. Y.

Application May 16, 1941, Serial No. 393,744

10 Claims. (Cl. 24—87)

This invention relates to extensible spring tensioned fastening devices for holding garments, wearing apparels, draperies and similar articles in assembled relationship in a resilient and releasable manner, and the various objects of the invention are:

To provide a simple tension element which is easily adaptable to different styles and makes of buckles and hooks, providing thereby a determined amount of resiliency in an otherwise inextensible article, which will give more comfort to the wearer.

To provide an improved pin or collar holder, which is extensible, simple, attractive in appearance, which has novel manipulating means, finger protective means, and which by the novelty of its two pointed prongs on each side, provides more secure and rigid anchorage into the hemmed edges of a soft collar, together with a grip over a sufficient area to prevent tearing and wrinkling of the fabric.

To provide a simple extensible pin which may be used as a garment pin whenever not in direct contact with the body of the wearer, and which may find useful purposes in various industries where fabrics are in use.

To provide an extensible self-locking garment hook which has novel attaching means.

To provide an extensible self-locking drapery hook, for suspending draperies, curtains, and the like in a novel and resilient manner.

All the foregoing and still further objects of the invention will become apparent from a study of the following specification, taken in connection with the accompanying drawings in which:

Figures 1 and 2, are front and rear elevations of a pin or collar holder embodying the principles of the invention.

Figure 3, a detailed view in perspective of the essential elements of the pin.

Fig. 4a, a view partially in section, taken on line y—y of Fig. 3.

Fig. 4b, an enlarged view of one end of a spring.

Fig. 5a, a side elevation of the locking member adapted for the upper member of the pin.

Fig. 5b, a side elevation of the locking member adapted for the lower member of the pin.

Fig. 6, a view of the pin in perspective.

Fig. 7, a rear elevation of the pin fully extended.

Figs. 8, 9, 10, and 11, three modified forms of the pin,

Figs. 12, 13, 14, 15, 16, and 17, various plan views of garment buckles, embodying the invention, Fig. 18, a plan view; Fig. 19, a side elevation; Fig. 20a, the lower member; Fig. 20b, the upper member; of a self-locking garment hook.

Figs. 21, 22, and 23, a drapery hook in plan view, side elevation and disassembled relationship.

Referring in detail to the drawings it will be observed that all the illustrative forms of the invention have in common a structure, generally rectangular, extensible lengthwise within a pair of coil springs, which encircle the longitudinal side shanks of two relatively similar members, each member made of a suitable single length of material, preferably wire or rod, bent and rebent to provide two parallel shanks, a transverse bar and depending known types of attachments, such as pointed prongs, hooks, loops, eyelets and the like, that said transverse bar may be formed by the intermediate portion of the wire or may be formed by the free ends of said wire; the specific differences consisting mainly and being the result of suitable forming of the material to provide adequate attaching or suspending means, not necessarily of the same type on both sides of the device. Other differences will be evident as the description of each form is herein set forth.

It will also be noticed that in the drawings, throughout the description the upper member in each instance will be referred by the letter U, the lower one by L, and the transverse bars by T, and that the springs, for the purpose of clearness are either omitted or shown in broken lines in some cases.

The invention is shown in its simplest form at Fig. 3; two pieces of wire of the same length are provided, both ends are pointed needle-sharp, by right angular bending a pair of elongated U-shaped members are formed, U and L, each member providing intermediate its pointed ends a bight portion or transverse bar T, together with two parallel longitudinal shanks; a pair of compression coil springs I, in broken lines, of suitable strength and length, the inside diameter of which is slightly larger than the combined thicknesses of the wires, is also provided, then after passing endwise and lengthwise, first, each shank of one member inside each spring, the operation is repeated by passing in the same manner and in opposite direction through the other ends of the springs, the shanks of the other cooperating member, so as to have one side shank of each member sleeved together in overlying relation inside of each spring, the springs, being normally interposed between and in constant abutment against the inside edges of the transverse bars T of each member; the two members being slidable lengthwise within the springs and against their resistance; then the pointed ends of each member are reversely bent to form a pair of hooks 2, the pointed prongs of each member pointing at each other in opposite direction.

Referring to Fig. 4a, showing one end of each spring in abutment against the inner edge of the transverse bar of the U member together with sections of the L member in sliding relation inside the springs, it will be noticed that the wire ends 3, of each spring, are shielded laterally within the inner surface of the springs coils. When pre-formed members are used to manufacture the various devices described hereinafter, it is necessary to sleeve together the shanks of each member within the springs, by winding said springs endwise, between adjacent coils, encircling the two shanks at one time in a turning or twisting operation, then disposing of the wire ends 3, in the same manner.

The structure just described, presents in its entirety a simple tension element, which constitutes the gist of the invention, and which in its simplicity offers readily adaptable manipulating means normally provided by the bars T, which may be pinched between the fingers for extending the device, and which are also adaptable for locking means as will be explained hereinafter.

As a refinement to this simple pin, and to provide for better manipulation, for means of retaining the inserted fabric within the loops of the hooks, to provide for protection against pricking; a pair of slidable locking members or shields 4, the sides of which are shown in Figs. 5a, 5b and 6, the top in Figs. 1 and 6, the rear in Figs. 2 and 7, are provided, these shields may be made of any suitable material, metal, plastic or the like, and may assume a variety of shapes and ornamentations, provided they have the elements and serve the purposes herein described. In this instance, each locking member consists of a hollow frame, having a generally T-shaped cross section, made of a length of suitable metal tube which has been formed to provide a button-like head or stud 5, a depending body having two side walls 6, holes 7, on each side wall for slidable and retainable engagement on the shanks of each member, and a semi-circular terminal, the under surface of which is provided with longitudinal grooves 8, to abut against and shield therein the pointed ends of the pin. In manufacturing this pin, the locking members are connected to the side shanks by passing the stems of the shanks through the holes before forming the hooks 2, and as there is an upper and a lower member, the holes 7, are positioned accordingly as shown at Figs. 5a and 5b, therefore the locking member 4u, having higher holes will slidably embrace the shanks of the U member, and the locking member 4l will embrace the shanks of the L member, and in order that the pointed ends of the hooks be well adjusted to abut the inside of the grooves, the hooks of the L member must be bent at a sharper angle than the hooks of the U member. These asymmetrical differences are hardly noticeable in the actual size of the pin, which may be made of needle size steel wire, very small springs made of fine music wire, allowing for numerous coils in close succession, with the result that the encircled shanks are hardly visible, and when a study of the prior art reveals that efforts have been made to conceal the springs of such devices, it is to be noticed that in this case the springs rather contribute to the fine appearance of the pin.

Fig. 7, is an illustrative view of the pin fully extended, the springs fully compressed, at one end of the device the locking member abuts and shields the pointed hooks, while on the other end the hooks are free to engage the fabric, the locking member is in free, buffer-like position, it is evident that under the influence of the springs, when released, the locking members will constantly be shifted back against the hooks.

The device may be applied to a soft collar or a garment in several ways, it may be seized by the two projecting heads, which are pressed together toward each other to extend the pin, the device being released, sufficient contraction is caused by the springs tension to draw the hooks toward each other and thus grasp, insert, and hold the contacted fabric; it may also be applied by first inserting the hooks at one end of the pin into one flap of a collar, and then using the locking members to protect the fingers, insert the hooks on the other side of the pin into the other flap. The pin may be left inserted in one side of the collar for future use, it will not be lost when in use, it will adjust itself to incidental pulls and to the size of a necktie knot, it will neatly lift and support the necktie, it will be practically concealed from view if purposely and carefully inserted.

Referring to a modification of the pin shown in rear elevation and in perspective in Figs. 8 and 9, it shows a wider member Ux, and a narrow one Lx, their shanks in sliding relation alongside each other, both members having their bight portion bent slightly upward to form offsets or finger pieces 9, it provides a simpler pin which may be used in various industries for such purposes as fastening the ends of fabric remnants or the like, it may also be useful in hospitals for fastening heavy bandages.

Another modified form of the invention shown at Fig. 10, is a pin with only one pointed prong on each side, each member having a shorter shank in abutment against a longer one which is pointed and reversely bent to provide the hook, fastening means, such as welding may be required at point 10.

A further modification of the pin is shown in Fig. 11, in which the lower member L is bent to form a pair of coils 11, or a plurality of coils, on each shank adjacent the bight portion of the U-shaped member, said bight portion slightly projecting upward and between the shanks of the upper member U, to provide a finger piece 12, a self locking side is thus provided, resulting from the relative abutment of the pointed prongs against the under surface of the coils.

Figs. 12, 13, 14, 15, 16, and 17, illustrate the invention adapted to various known types of garment buckles, they are substantially similar to each other, differing only by the types of attaching elements, hereinafter described.

In Fig. 12, two transverse strap engaging loops 13—13, are provided, this buckle may be used with advantage on the belt portion of trousers or as a spring tensioned element for a belt.

In Fig. 13, a transverse strap engaging loop is provided on one side and on the other side a depending longitudinal U-shaped loop 14, adapted to receive and retain a button, this buckle may be used to fasten together the shoulder straps of overalls to the buttons usually attached to the bib porton of these garments; to engage or release a button, pressure is exerted on the bar T of member U, which will extend the device.

In Fig. 14, a transverse strap engaging loop is provided on one side and on the other side longitudinal outwardly pointed prongs 15—15, in abutting cooperation with a third member 16, pivotally attached to the frame of member U, and constituting another strap engaging loop; this known type of buckle is thus made resiliently extensible.

In Fig. 15, a transverse strap engaging loop is provided on one side and on the other, an inwardly bent U-shaped hook 17, this buckle will slidably grasp an anchorage element such as a metal loop or the like and securely retain it within the loop of said hook, resulting from the normal interposition of the bar T of member U, about the opening of the hook; pressure exerted on bar T of member L, will extend the device to release the anchored element.

Figs. 16 and 17, are a plan view and side elevation of a buckle having two similar sliding members U and L, each one providing on its outer end, an inwardly bent U-shaped hook 18, preferably of a semicircular outline, these two cooperating members are positioned in overlying relation so as to have their hooks pointing inwardly in opposite direction from the plane of the buckle structure, in such a way that the bar T, of each member be normally interposed about or within the opening of the hook carried by the other member, providing thereby a locking element for each hook; this buckle may be constructed with advantage with sleeves or rollers on each transverse bar; this novel hook will grasp an anchorage element, such as a metal loop, bar, or the like, independently on either side, the constant resistance of the springs will prevent release of the anchored elements, unless purposely manipulated. Applied to working or sport clothes, it will provide an improved resilient fastener, giving comfort to the wearer, and being readily removed from the garment for laundry purposes.

Figs. 18, 19, 20a and 20b, show in plan view, side elevation, and disassembled relationship a garment hook embodying the invention which will grasp and retain an anchorage element such as a garment loop 19, or the cross bar of a belt, and which is intended to be attached or sewn to a wearing apparel, preferably between two layers of fabric, leather, or the like, as illustrated in cross section at 20 in Fig. 19, and which embraces in its construction two slidable cooperating members, one of which, member L, is made of a single length of wire bent to provide intermediate its ends a bar 21, two semicircular loops or eyelets 22, two parallel shanks, and two eyelets 23, formed by its free ends reversely bent laterally of the shanks; the other, member U, is made of a single length of wire bent U-shaped to provide a bight portion, two longitudinal shanks, a bar 24, formed by its free ends, and a reversely bent U-shaped hook 25, two compression springs are provided each one encircling sleeve-like and together one shank of each member in overlying and sliding relation, the springs being interposed between, and in abutment against, the transverse bar 24, of member L, on one side, and the lateral offsets formed by the eyelets 22, on the other side. This novel garment hook provides improved attaching means, and is intended to be sewn or attached to the fabric at four places, through the eyelets 22 and 23, the bar 21, assuring rigidity of the edge of the fabric serves to retain the anchored element within the loop of the hook by its normal interposition there between the opening of said hook, the release of the anchored element being obtained by manual operation.

Figs. 21, 22, and 23, show in plan view, side elevation, and disassembled relationship, an extensible, self-locking drapery hook, adapted to be sewn or attached to draperies, curtains or the like for the purpose of suspending them, resiliently to, and slidably along, a supporting rail, bar or the like, and which embraces in its construction two cooperating sliding members, one of which L, is a symmetrical, generally rectangular frame, made of a single length of wire bent and rebent to provide two parallel side shanks, four semicircular loops or eyelets 26, two cross bars 27 and 28, the plane of the shanks different from that of the eyelets and bars by successive rightangular bendings 29; the cooperating member U, is made of a single length of wire bent right angularly intermediate its ends to provide a bight portion or bar 30, two parallel shanks, another cross bar 31, and a U-shaped loop or hook 32, formed by reversely bending the bight portion; the two cooperating members are positioned in overlying and sliding relation in such a manner that the tip of the hook or cross bar 30, of member U, comes in abutting relation against the bar 28 of member L, one shank of each member being sleeved together and slidable lengthwise within the two coil springs, the ends of said springs being on both sides in idle abutment against the offsets provided by the bendings 29, and on one side in working or compressing abutment against cross bar 31 of member U; member L, being intended to be sewn or attached to a drapery 33, in cross section in Fig. 22, through the eyelets 26, becomes in effect a stationary member, while member U, remains slidably movable lengthwise within the springs and against their resistance whenever manual pressure is exerted on bar 31, with the apparent result that bars 28 and 30, part from each other, allowing for passage of a supporting rail, shown in cross section at 34, which will be retained there within a closed ring formed by the loop of the hook in cooperation with the right angular bendings 29. This novel hook presents obvious advantages, it is easily and securely attached to draperies, curtains, or the like, it is easily manipulated, the springs are free from any friction with the fabric, it will freely slide over a supporting rail, and will resiliently counteract incidental pulls made on the suspended drapery. It is evident that the size and shape of the hook, should be of such conformation as to match a supporting rail, bar, or the like.

Although I have described in detail and have illustrated several different embodiments of the invention, which is capable of a wide range of variations, it is to be understood, that the present disclosure is illustrative rather than restrictive, that whenever certain terms or words have been used such as a strap, it may refer to garments, belts, suspenders or any other type of wearing apparel, and that changes and modifications may be resorted to, without departing from the spirit or the scope of the claims appended hereto.

I claim:

1. An extensible spring-actuated self-locking fastener adapted to hold garments, draperies and the like, in assembled relationship, comprising in combination: two substantially similar frames, each one made of a single length of wire bent to form: two parallel side shanks, garment attaching means at its outer end, and transverse elements at its inner end; with two compression coil springs threading together on each side one shank of each frame, said springs being the sole means for slidably connecting and counter tensioning said frames one upon another in opposite directions; and said attaching means for at least one of said frames forming an inwardly opened loop receiving portion having its opening adapted, and of suitable relative dimension, to be automatically closed under said counter-tension by the normal interposition thereagainst of said inner end portion of said oppositely directed frame, leaving space within said loop portion for retaining anchored elements, and automatically released from said interposition by the normal withdrawal therefrom against spring tension, of said inner end portion of said oppositely directed frame.

2. An extensible spring actuated self-locking fastener adapted to hold garments, draperies and the like in assembled relationship comprising in combination: two substantially similar frames, each one made of a single length of wire bent to form: two parallel side shanks, an inwardly opened loop receiving portion at its outer end, and transverse elements at its inner end; with two compression coil springs threading together on each side one shank of each frame, said springs being the sole means for slidably connecting and counter tensioning said frames one upon another in opposite directions; and said loop receiving portions having their openings adapted and of suitable relative dimension to be automatically closed under said counter-tension by the normal interposition thereagainst of said inner end portions of said oppositely directed frames respectively, leaving space within said loop portions for retaining anchored elements, and automatically released from said interposition by the normal withdrawal against spring tension of said inner end portions from said loop receiving portions.

3. An extensible spring actuated self-locking fastener adapted to hold garments, draperies and the like in assembled relationship, comprising in combination: two substantially similar frames, each one made of a single length of wire bent to form: two parallel side shanks, garment attaching means at its outer end, and transverse elements at its inner end; with two compression coil springs threading together on each side one shank of each frame, said springs being the sole means for slidably connecting and counter tensioning said frames one upon another in opposite directions; and said attaching means for at least one of said frames forming an inwardly opened loop receiving portion having its opening adapted and of suitable relative dimension to be automatically closed under said counter-tension by the normal interposition thereagainst of a transversely coiled portion constituting said inner end portion of said oppositely directed frame, leaving space within said loop portion for retaining anchored elements, and automatically released from said interposition by the normal withdrawal therefrom against spring tension, of said inner end portion of said oppositely directed frame.

4. An extensible spring-actuated self-locking pin fastener comprising in combination: two U-shaped frames, each made of a single length of wire, each one having two parallel pointed shanks threaded endwise in opposite directions through the coils of two compression springs, said springs being the sole means for slidably connecting said frames one upon another under lengthwise counter-tension; two transverse sliding members, each having a substantially T-shaped body of substantially tubular form, provided with a button-like projection on its upper side and a pair of point-shielding grooves on its under side, each one transversely and slidably embracing the shanks of each frame respectively, through holes within said body threading said pointed shanks, said holes provided on each member at different level to bring said sliding members into alignment on the frames; a hook portion, formed on each frame by said pointed shanks inwardly bent toward said sliding members, and having its opening of suitable relative dimension to be closed by said sliding members respectively, leaving space within said hook portions for retaining elements to be connected, and adapted to contact under said spring tension the under side of said sliding members into point-shielding hook-locking position, hook-opening position being obtained by manipulating said sliding members against spring tension.

5. An extensible spring-actuated self-locking pin fastener comprising in combination: two U-shaped frames, each one having two parallel pointed shanks threaded endwise in opposite directions through the coils of two compression springs, said springs being the sole means for slidably connecting said frames one upon another under lengthwise counter-tension; two transverse sliding members, each having a substantially T-shaped body provided with manipulating projections on its upper side and point-shielding means on its under side, each one transversely and slidably embracing the shanks of each frame respectively, through slidably retaining means within said body threading said pointed shanks; a hook portion formed on each frame by said pointed shanks inwardly bent toward said sliding members, and having its opening of suitable relative dimension to be closed by said sliding members respectively, leaving space within said hook portions for retaining elements to be connected, and adapted to contact under said spring tension the under side of said sliding members into point-shielding hook-locking position.

6. In a spring-actuated pin fastener comprising in combination, two elongated frames provided at their outer ends with inwardly bent pointed hook portions, threaded in opposite directions one upon another through coiled spring elements interposed thereon between their inner ends, and slidably connecting said frames under lengthwise counter-tension: two transverse hook-closing members, each one having a substantially T-shaped body of suitable relative dimension to close said hook portions respectively, leaving space within said hook portions for retaining elements to be connected, and provided with manipulating projections on its upper side and point-shielding means on its under side, each one transversely and slidably embracing each respective frame adjacent said hook portion through slidably retaining means within said body threading said frame, and adapted to contact under said counter-tension the free end of said hook portion into point-shielding hook-locking position.

7. In a spring-actuated garment fastener comprising in combination, two members longitudinally and slidably connected in opposite directions adjacent each other under lengthwise spring counter-tension, and having at their outer ends hook portions pointing and normally urged toward each other: a hook-closing member transversely and slidably connected on at least one of said members, through slidably retaining means embracing said connected member adjacent its hook portion, and having a body of suitable relative dimension to close the opening of said hook portion leaving space for retaining anchored elements therewithin, and adapted to automatically contact under said counter-tension the free end of said hook portion into hook-closing position.

8. In a spring-actuated garment fastener comprising in combination, two members longitudinally and slidably connected in opposite directions adjacent each other under lengthwise spring counter-tension, and having at their outer ends hook portions pointing and normally urged toward each other: hook-closing members of suitable relative dimension to close the openings of said hook portions leaving space for retaining anchored elements therewithin, transversely and slidably connected on said counter-tensioned members and adapted to contact under said tension the free ends of said hook portions into hook-closing position.

9. In an extensible spring actuated garment pin comprising in combination two elongated frames provided at their outer ends with inwardly bent hook portions, threaded lengthwise in opposite directions adjacent each other through coiled spring elements interposed thereon between their inner ends and slidably connecting said frames under lengthwise counter-tension: transverse sliding members of suitable relative dimension to close under said counter-tension the openings of said hook portions, leaving space for retaining anchored elements therewithin, embracing each respective frame adjacent its hook portion through slidably retaining means threading said frame, and adapted to be manually operated lengthwise, selectively inwardly or outwardly against spring tension, to extend the pin.

10. An extensible spring actuated self-locking fastener adapted to hold articles in assembled relationship comprising in combination: two substantially similar elongated frames provided with attaching means at their outer ends, threaded lengthwise in opposite directions adjacent each other through coiled spring elements interposed thereon between their inner ends and slidably connecting said frames under lengthwise counter-tension; and said attaching means for at least one of said frames, forming an inwardly opened loop receiving portion having its opening adapted and of suitable relative dimension to be automatically closed under said counter-tension by the normal interposition thereagainst of said inner end portion of said oppositely directed frame, leaving space within said loop portion for retaining anchored elements, and automatically released from said interposition by the normal withdrawal therefrom against spring tension of said inner end portion of said oppositely directed frame.

ROBERT OLLIVIER.